Patented Dec. 3, 1935

2,022,738

UNITED STATES PATENT OFFICE 2,022,738

BLEACHING OF FATTY ACIDS, OILS, AND FATS

Balthasar E. Reuter, New York, N. Y., assignor to The Mathieson Alkali Works, Inc., New York, N. Y., a corporation of Virginia No Drawing. Application June 23, 1933, Serial No. 677,269

8 Claims. (Cl. 87—12)

This invention relates to the bleaching of fatty acids and of animal, vegetable and fish fats and oils and more particularly to an improved process for bleaching such materials with hypochlorites of the elements of the alkali and alkaline earth groups.

Attempts have been made to bleach fats and oils, from which the free fatty acids have been removed, by treatment with dry hypochlorite. However, in such treatment it has been the practice to add all the treating agent in dry form and at one time. Such a process has not, however, proven satisfactory and the present invention relates to an improvement in the procedure by which greatly improved results may be obtained.

It is an object of the present invention to provide a process whereby free fatty acids from animal, vegetable and fish, fats and oils, for example, including stearic, oleic, palmitic, lauric, linoleic, etc., or combination of these, may be bleached by the action of a hypochlorite. It is a further object to provide an improvement in the process for treating animal, vegetable and fish fats and oils whereby these may be satisfactorily and economically bleached on a commercial scale and without excessive chlorination of the product. Another object is to provide an improved process for bleaching animal, vegetable and fish fats and oils, or the free fatty acids thereof, with a hypochlorite of an alkali or alkaline earth element and particularly with calcium hypochlorite. Other objects will become apparent.

The present invention resides broadly in the repeated treatment of the fatty acids, fat or oil with only a fraction of the total quantities of the hypochlorite required to give the desired bleaching and to repeatedly heat and settle the mixture during each treatment. The hypochlorite may be added dry, but is preferably added in the form of a solution. Calcium hypochlorite is prefered, although the other hypochlorites of the alkali and alkaline earth groups, for example, sodium hypochlorite, or a mixture of a hypochlorite with sodium chloride, may be used. The invention also includes broadly the treatment of such materials with a solution of the hypochlorite, as differentiated from the use of dry hypochlorite. The hypochlorite should contain from 40 to 75% available chlorine and preferably about 65% available chlorine. In the following discussion the quantities of calcium hypochlorite will be based upon a product containing 65% available chlorine, it being understood that with a hypochlorite containing more available chlorine, a smaller quantity may be used and that with one containing less available chlorine a larger quantity may be necessary.

In describing the invention, reference will be made to preferred applications of it, although it is not intended to limit it to the procedures described.

A standard bleaching liquor is prepared by adding calcium hypochlorite containing about 65% available chlorine (or an equivalent amount of a hypochlorite of higher or lower available chlorine) to cold water in the proportions of about 20 pounds of the hypochlorite to 2000 pounds of water. It is preferred to use a hypochlorite containing about 10% or more of sodium chloride or to add an equivalent amount of sodium chloride to the solution. The mixture is agitated for about half an hour and allowed to stand for about five hours. The clear liquid is then decanted or otherwise separated from the sludge and used in the subsequent operations. Its concentration may, of course, be varied, but I prefer to make the standard bleaching solution more concentrated than that with which the material is to be treated and to add water to the material to dilute the standard solution. If desired, it can be made of the proper strength for treating the material without dilution, in which event no water need be added to the material being treated.

In the treatment of the oil, fat or fatty acids, the material being bleached is heated and cold or hot water is added to it. The amount of water added depends upon the amount of dilution of the standard bleaching solution required to give the desired degree of bleach to the material being treated. This mixture is brought to a temperature of about 140 to 210° F. and preferably allowed to stand to allow settling of the water. A fraction of the total bleach liquor required to give the desired bleach is then added to the mixture and allowed to stand without heat or agitation for about 5 to 15 minutes to allow a portion only of the hypochlorite to decompose and liberate oxygen and chlorine. The mixture is then agitated for about 1 to 3 minutes, preferably about 1 minute, and allowed to stand for 5 or 10 minutes. This agitating and standing is repeated several times without heating, during which time the temperature drops to about 125 to 150° F. Heat is then applied, without agitation, until the mixture is again heated to 190 to 210° F. to make the mixture more liquid, break the emulsion and further decompose the hypochlorite. The agitating and standing are repeated, the mixture being heated periodically to maintain the mixture warm during the settling periods. After repeating the agitating and settling steps, with periodic heating, several times, the watery fraction is settled and separated and the entire first stage may be repeated several times, each time adding more water and bleaching liquor and repeating the agitating and settling steps, with periodic heating, as above described.

Between each stage as above described or after a portion of the stages or only the last stage, the the material being treated may be acidified. In this operation the watery fraction is removed and the material being treated is heated to about 210 to 215° F. About half its quantity of water and sufficient acid, for example, sulphuric or preferably hydrochloric acid, to neutralize the base and result in a slightly acid water fraction after agitation, is added and the mixture agitated at a temperature of about 200 to 212° F. for about half an hour. The agitation is then discontinued and the mixture allowed to settle for about an hour at 190° F. The watery portion may then be withdrawn and the material being treated may be agitated with about its own weight of water at a temperature of about 210 to 215° F. for about half an hour. The mixture may then be allowed to stand for about one hour at a temperature of 190 to 200° F., after which the heating may be discontinued and the mixture allowed to stand about three hours to settle the watery portion. The latter may then be withdrawn and the remainder heated for about four hours at a temperature of 215° F. to dry it, after which it may be cooled and used as required. If desired, superheated steam may be bubbled through the mass periodically during the drying step.

The following is a specific example of the use of my process in the bleaching of fatty acids. These may be produced by decomposing or splitting hydrogenated vegetable or fish oils, tallow, cocoanut oil, palm kernel oil, palm oil, peanut oil, corn oil, cotton seed oil and other animal, vegetable and fish, fats and oils, by catalytic action, for example, as described in the following United States patents: 601,603, 628,503, 1,068,079, 1,079,437, 1,087,888, 1,298,563, and 1,319,027. Or the fatty acids may be recovered by acid treatment of the "foots" resulting from the refining of the above fats and oils, or made by synthesis. The procedure is particularly applicable to free fatty acids separated by catalytic action, as described in the above patents.

16,000 pounds of fatty acids, produced by catalytic action upon hydrogenated fish oil and containing as high as 98 to 100% free fatty acids, were heated to about 212° F. and 14,400 pounds of cold water were added and the mixture was heated from the bottom, by a closed steam coil, until the water was brought to a temperature of about 190° F. and the fatty acids to about 170° F.

1600 pounds of bleaching liquor, prepared as described above, were added and the mixture allowed to stand for 15 minutes. The mixture was then agitated, without heating, for 1 minute and allowed to stand 5 minutes. This agitating and standing were repeated two more times, during which the average temperature of the mixture dropped to 132° F.

The mixture was then heated, without agitation, until the water at the bottom was 210° F. and the fatty acids at the top 202° F. The mixture was then agitated for 1 minute (the mixture temperature being about 204° F.) and allowed to stand 10 minutes, maintaining the temperature at 190 to 210° F. This agitating and standing was repeated five more times, after which agitation was discontinued and the watery portion allowed to settle, maintaining the temperature at about 190 to 210° F. The watery portion, together with any sludge, soapy matter, albuminous or nitrogenous matter, was withdrawn from the bottom.

The fatty acids were again heated to about 212° F. and 14,400 pounds of water and 1600 pounds of bleaching liquor were added as described above. The several steps of agitating and standing were repeated as described above, maintaining approximately the same temperatures and times and removing the watery fraction after the last step.

The stages of adding water and bleaching liquor and repeated agitating and standing were repeated three more times, approximately as described above for the first two stages.

At the end of the fifth stage, the watery portion was removed and the fatty acids were heated to 212 to 215° F. 8000 pounds of water and 50 pounds of chemically pure hydrochloric acid with 100 pounds of water were added and the mixture was heated and maintained at 200 to 212° F. for half an hour, after which agitation was discontinued and the mixture was allowed to settle at about 190° F. for one hour. The watery portion was then withdrawn, leaving the fatty acids in the tank.

The bleaching operation was then repeated and after five more bleaching stages, including the repeated agitating and standing steps, as described above, the watery fraction was withdrawn and the fatty acids were heated at 212° F. and 8000 pounds of water were added and the mixture was agitated half an hour at 200 to 212° F. The agitation was then discontinued and the mixture was allowed to stand at 190° F. for one hour.

The watery portion was then withdrawn and the fatty acids were heated to about 212° F. 8000 pounds of water and 55 pounds of chemically pure hydrochloric acid with 100 pounds of water were added and the mixture was agitated at about 200 to 212° F. for half an hour, when the agitation was discontinued and the mixture allowed to stand for one hour at 190° F.

The watery portion was then withdrawn and the fatty acids were heated to 212° F. and 16,000 pounds of water were added. The mixture was agitated for half an hour at 210 to 215° F., after which the agitation was discontinued and the mixture allowed to stand one hour at 190 to 200° F. The heating was then discontinued and the mixture allowed to stand three hours. The watery portion was separated and the fatty acids were heated for four hours at about 215° F. This completed the treatment.

Unrefined tallow was bleached in a similar manner by heating 1000 pounds of the tallow to 212° F. and adding 800 pounds of water and 200 pounds of the standard bleach liquor, subjecting the mixture to a plurality of agitating and settling steps and repeating the stages in a manner similar to that described for bleaching fatty acids.

After five such stages, the tallow portion was heated to 212 to 215° F. and 500 pounds of water and 3 pounds of chemically pure hydrochloric acid with 7 pounds of water were added. The mixture was agitated at 210 to 212° F. for half an hour and the agitation was discontinued and the mixture allowed to stand at about 190° F. for one hour.

The stages of bleaching were then repeated for five times, after which the tallow was agitated with 500 pounds of water at about 212° F. and the mixture allowed to stand one hour at about 190° F.

The tallow fraction was separated and heated to 212° F. 500 pounds of water and 4 pounds of chemically pure hydrochloric acid, together with 11 pounds of water were added. The mixture was agitated for half an hour at about 210 to 212° F. and allowed to stand for ¾ hour at 190° F. The tallow fraction was separated and heated to 212° F. and 1000 pounds of water were added, the mixture being agitated at 210 to 215° F. for one hour and allowed to stand for two hours. The tallow fraction was then heated to 212 to 220° F. for four hours (without agitation) and superheated steam was injected into the tallow for one minute after the first and third hours. The finished product was filled into containers.

Unrefined or refined cocoanut oil, peanut oil, corn oil, cotton seed oil, linseed oil, sesame oil, palm kernel oil, palm oil, fish and whale oils and greases of animal origin and the fattty acids of the above oils and fats and the fatty acids of tallow may be bleached as described above, using a total amount of calcium hypochlorite (on a dry basis) in the proportions of ½ to 2 pounds of hypochlorite (containing an average of 65% of available chlorine) to 100 pounds of fat, oil or fatty acids. The total amount of hypochlorite depends upon the hypochlorite used, the color and degree of refinement of the material being bleached and the degree of color or bleach required in the finished product. I prefer to bleach the oil or fat before it is refined, because my treatment expedites the subsequent refining and reduces the refining loss. If this is done, a larger quantity of hypochlorite is required in the bleaching operation, since a portion of it is used up in reactions with the non-fatty material, and nitrogenous or albuminous matters which are ordinarily removed by the refining treatment.

The bleaching liquid prepared as described herein may be used to advantage in the treatment of the fatty acids, fats or oils in a single stage or single step as hereinbefore described, but it is preferred to use it in a plurality of steps and stages. For example, the entire quantity of bleach liquor required to give the desired bleach may be added at once, the mixture being agitated and allowed to stand, as described above, 2 to 4 times, driving the temperature down. Then the mixture may be heated to 190 to 212° F. and the agitating and standing, as described above, repeated 2 to 6 times. The watery portion may then be drawn off and the material being bleached may be neutralized by adding water and sufficient dilute hydrochloric or sulphuric acid to make the washing water slightly acid. In this and in the other examples the material may be neutralized by adding acid of proper dilution without adding water to the oil, fat or fatty acid before adding the acid. Likewise, the hypochlorite may be added while cold to at least in part contribute to the cooling of the fats, oils or fatty acids.

The steps and stages described above may also be used to advantage with the addition of dry calcium hypochlorite to a mixture of water with oils, fats or fatty acids, adding, for example, one tenth of the total quantity of dry hypochlorite in each stage. An advantage may also be obtained by adding dry calcium hypochlorite in increments to the oils, fats, or fatty acids without addition of water. However, I prefer to add the hypochlorite in the form of a solution.

The number of repetitions of the steps and stages described and the particular times and temperatures may be varied to suit particular requirements. For example, I have bleached cocoanut oil fatty acids recovered by acidification of the "foots" from the refining of cocoanut oil, by heating 5000 pounds of the fatty acids to about 212° F., adding 4000 pounds of cold water (bring the temperature to 160° F.) and 966⅔ pounds of the standard bleaching liquor described above. The mixture was allowed to settle 15 minutes and agitated one minute, settled 5 minutes and the agitating and settling were repeated two more times, the temperature dropping to 145° F. The mixture was then heated to 208° F. and maintained at that temperature one hour with agitation for one minute every ten minutes throughout the hour. The mixture was then allowed to settle ½ hour and then maintained at about 208° F. for another hour with agitation for one minute every 10 minutes of the hour.

An additional 966⅔ pounds of bleaching liquor was then added (without removing the watery fraction). The agitating and settling, without and with heating, were then repeated as described in the preceding paragraph and the mixture allowed to settle for ½ hour. Another addition of 966⅔ pounds of bleaching liquor was then made (without separating the watery fraction) and the agitating and settling, without and with heating, were repeated. The mixture was then allowed to settle one hour and the watery section separated.

The stage described in the last two paragraphs was then repeated two more times, making nine steps in three stages. After the separation of the watery fraction in the last stage, the fatty acids were washed with 4000 pounds of water at 210° F. This water was withdrawn and 4000 pounds of water and 25 pounds of 20° Baumé hydrochloric acid were added. The mixture was heated and agitated for ½ hour at 210° F. and settled and the watery fraction withdrawn. The fatty acids were washed with 4000 pounds of water, agitated at 210° F. and settled for ½ hour and the water was withdrawn and the bleached fatty acids were dried by heating at 212 to 215° F. for five hours.

With some oils and fats and fatty acids the addition of bleaching liquor may be repeated until all of the bleaching liquid is added. With other materials it is preferable to separate the watery fraction after about five treatments and to wash and acidify the product before repeating the treatment with additional quantities of calcium hypochlorite. If desired, the calcium salts and oils in the watery fraction may be recovered by adding sufficient acid, for example, hydrochloric or sulphuric, to neutralize the calcium and liberate the oil. The liquid or solid bleaching agent may also be added slowly, continuously or substantially continuously with agitation, heating and settling, although it is preferred to follow the procedure described above.

By following the above procedure, fatty acids or fats and oils with or without removal of free fatty acids, may be bleached and an improved product will be obtained which is free from combined chlorine and at a lower consumption of hypochlorite. It is important that the calcium hypochlorite be added in increments and that the mixture be maintained in a fluid condition but at a relatively low temperature, for ½ to 1 hour after each addition of the bleaching solution. It is preferred to agitate the mixture periodically, but this may be omitted, if desired. With more liquid oils it is not necessary to maintain the temperature as high, while adding the bleaching solution, as with oils or fats of higher melting point, but in all cases the temperature of the mixture should be raised to above about 160° F. after the initial settling period following the addition of the hypochlorite.

It is also preferred to allow the temperature to drop after adding the bleaching liquor, but good results may be obtained by maintaining the temperature at about 190 to 212° F., after each addition of the bleaching material, with periodic agitation for one minute about every five or ten minutes for an hour or an hour and a half, while the calcium hypochlorite is being decomposed. The mixture may then be allowed to settle while the temperature is maintained at about 190° F. In some instances this operation at higher temperatures is advantageous, since it hastens the decomposition of the bleaching material and the settling of the watery fraction.

It is obvious that the above described procedures may be varied in many respects and it is not intended to limit the invention to the particular temperatures, times, sequences of steps, concentrations, proportions, etc. given in the illustrative examples. Variations may be used to advantage in the treatment of particular oils or fats or fatty acids or under particular conditions of operation. The terms used in describing the invention have been used in their descriptive sense and not as terms of limitation and it is intended that all equivalents of the terms used be included within the scope of the appended claims.

What I claim is:

1. A method for treating fats, oils and fatty acids, comprising heating the fat, oil or fatty acid to above about 140° F., adding a cold solution of calcium hypochlorite and allowing the temperature to reduce during alternate periods of agitating and settling, and then heating to above about 160° F. and allowing the mixture to settle.

2. In the bleaching of fatty acids or animal, vegetable and fish oils or fats, the steps comprising adding a quantity of hypochlorite of an alkali or alkaline earth element, sufficient to give the desired bleach to the fatty acids, oil or fats, in small quantities with repeated heating and settling during such additions, the oil, fat or fatty acid being heated to about 140° F. with water and the small quantity of hypochlorite added thereto and the mixture being further heated to about 160 to 212° F., after which the mixture is allowed to settle.

3. In the bleaching of fatty acids, animal, vegetable and fish oils and fats, the improvement which comprises heating the fatty acid, oil or fat to be bleached to a temperature between about 140° F. and the boiling point of water, adding a total quantity of a hypochlorite of an alkali metal or an alkaline earth metal sufficient to give the desired bleach in successive small increments in solution in water, the interval between such additions being sufficient to allow consumption of the added increment, cooling the fatty acid, oil or fat at the time of the addition of each such increment, permitting the fatty acid, oil or fat to stand for a period, then agitating the fatty acid, oil or fat and added hypochlorite solution for a period and finally permitting the solution to settle from the fatty acid, oil or fat between each successive addition, and reheating the fatty acid, oil or fat after each such settling, the fatty acid, oil or fat being heated to a temperature above 160° F. after the initial settling period following the addition of hypochlorite.

4. In the bleaching of fatty acids, animal, vegetable and fish oils and fats, the improvement which comprises heating the fatty acid, oil or fat to be bleached to a temperature between about 140° F. and the boiling point of water, adding a total quantity of a hypochlorite of an alkali metal or an alkaline earth metal sufficient to give the desired bleach in successive small increments in solution in water, the interval between such additions being sufficient to allow consumption of the added increment, cooling the fatty acid, oil or fat immediately prior to each addition of hypochlorite solution by the addition of water of lower temperature, permitting the fatty acid, oil or fat to stand for a period, then agitating the fatty acid, oil or fat and added hypochlorite solution for a period and finally permitting the solution to settle from the fatty acid, oil or fat between each successive addition, and reheating the fatty acid, oil or fat after each such settling, the fatty acid, oil or fat being heated to a temperature above 160° F. after the initial settling period following the addition of hypochlorite.

5. In the bleaching of fatty acids, animal, vegetable and fish oils and fats, the improvement which comprises heating the fatty acid, oil or fat to be bleached to a temperature between about 140° F. and the boiling point of water, adding a total quantity of a hypochlorite of an alkali metal or an alkaline earth metal sufficient to give the desired bleach in successive small increments in solution in water, the interval between such additions being sufficient to allow consumption of the added increment, cooling the fatty acid, oil or fat by the addition of increments of hypochlorite solution of lower temperature, permitting the fatty acid, oil or fat to stand for a period, then agitating the fatty acid, oil or fat and added hypochlorite solution for a period and finally permitting the solution to settle from the fatty acid, oil or fat between each successive addition, and reheating the fatty acid, oil or fat after each such settling, the fatty acid, oil or fat being heated to a temperature above 160° F. after the initial settling period following the addition of hypochlorite.

6. In the bleaching of fats, oils and fatty acids, the improvement which comprises adding to said fat, oil or fatty acid while it is at a temperature above about 140° F. a hypochlorite of one of the elements of the alkali or alkaline earth metals in increments, the interval between such additions being sufficient to allow consumption of the added increment, allowing cooling of the fat, oil or fatty acid at the time of each such addition, and heating, agitating and settling the mixture after each such addition, the fat, oil or fatty acid being heated to a temperature above about 160° F. after the initial settling period following the addition of hypochlorite.

7. In the bleaching of fats, oils and fatty acids, the improvement which comprises adding to said fat, oil or fatty acid while it is at a temperature above about 140° F. a quantity of hypochlorite of an alkali or alkaline earth element sufficient to give the desired bleach to the fat, oil or fatty acid, in small quantities, the interval between such additions being sufficient to allow consumption of the added quantity, allowing cooling of the fat, oil or fatty acid at the time of each such addition, the mixture being heated to about 160 to 212° F., agitated and allowed to settle after each such addition.

8. In the bleaching of fats, oils and fatty acids, the improvement which comprises adding to said fat, oil or fatty acid while it is at a temperature above about 140° F. a quantity of a hypochlorite of an alkali or alkaline earth element, sufficient to give the desired bleach to the fat, oil or fatty acid, in small quantities, the interval between such additions being sufficient to allow consumption of the added quantity, allowing cooling of the fat, oil or fatty acid at the time of each such addition, heating and settling after such additions, the fat, oil or fatty acid being heated to a temperature above about 160° F. after the initial settling period following the addition of hypochlorite, separating the water fractions and acidifying them to liberate the free fatty acids from the suspended soap, and returning the separated fatty acids to the bleaching operation.

BALTHASAR E. REUTER.